Oct. 30, 1934.  C. P. POWERS  1,978,505
HARVESTING MACHINE
Filed Jan. 3, 1934   3 Sheets-Sheet 1
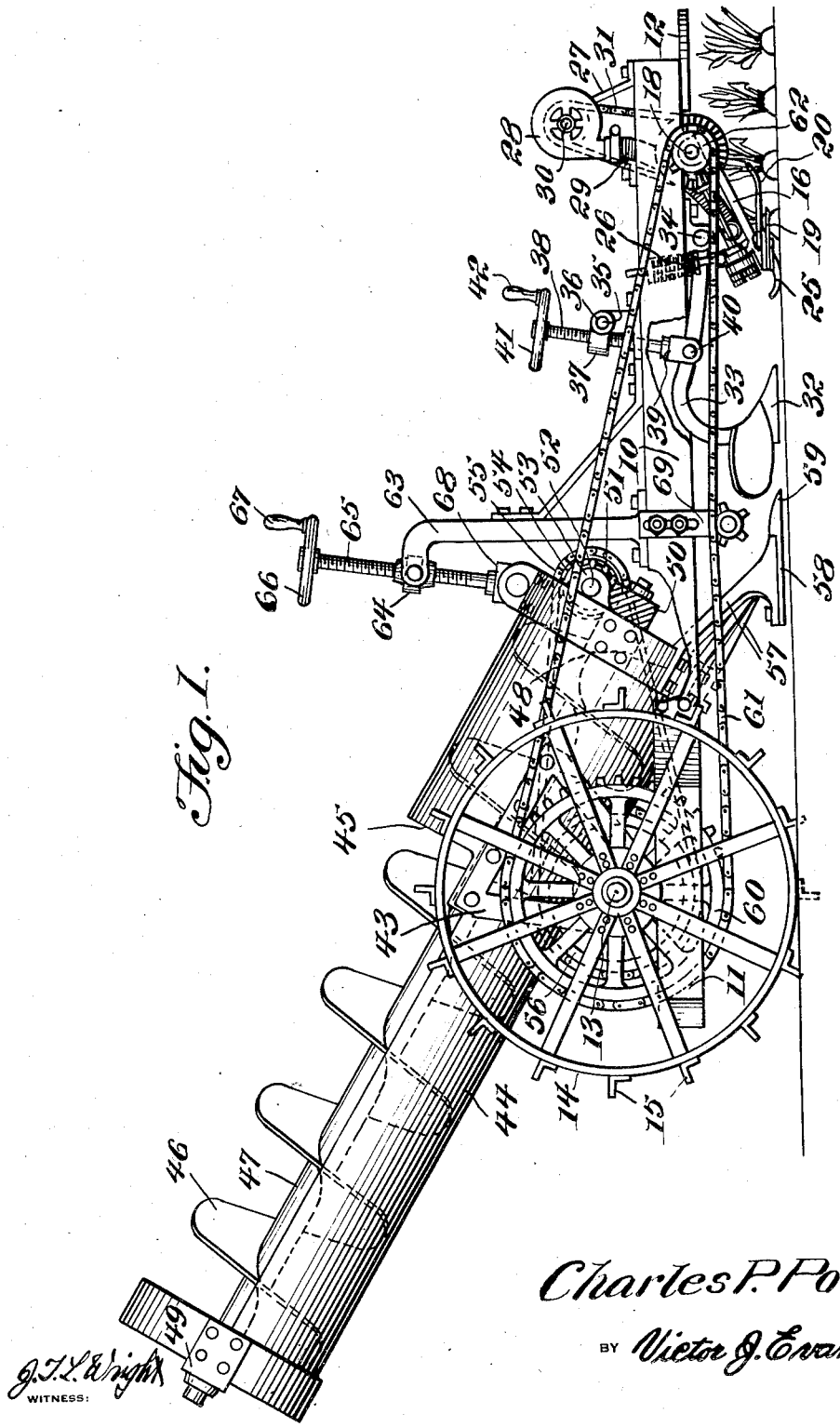

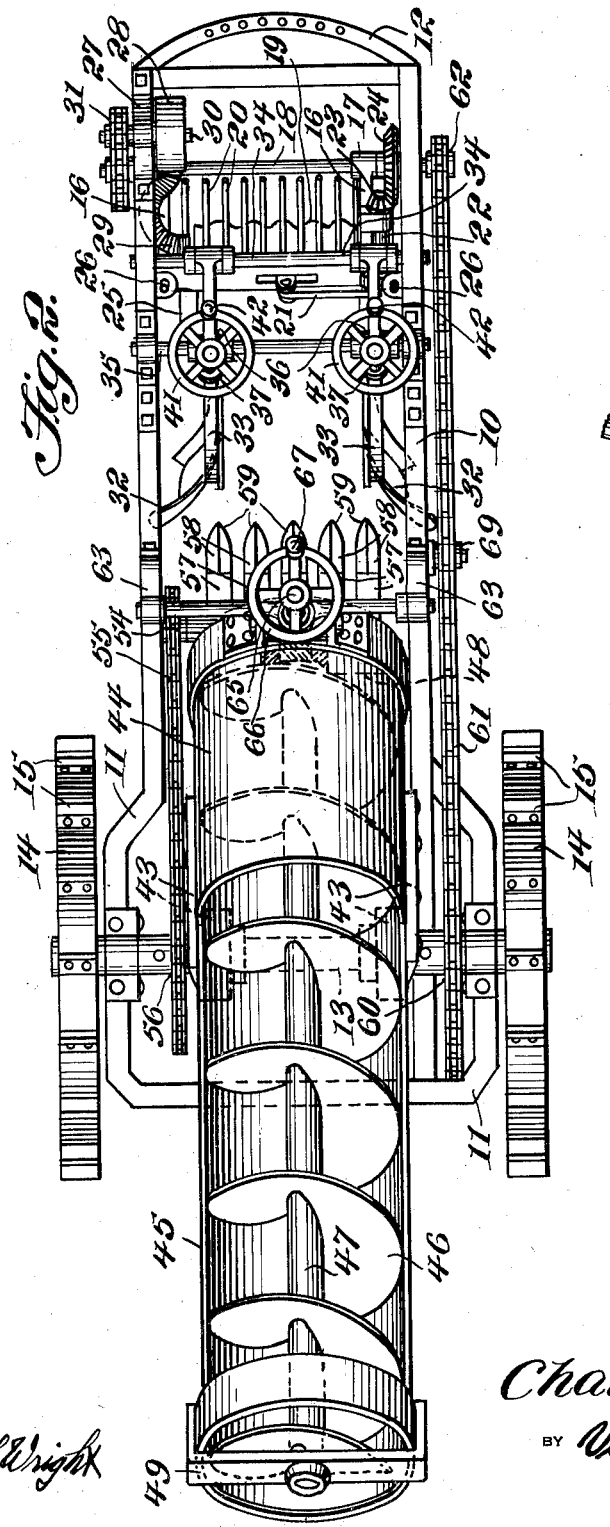

Oct. 30, 1934.     C. P. POWERS     1,978,505
HARVESTING MACHINE
Filed Jan. 3, 1934     3 Sheets-Sheet 3
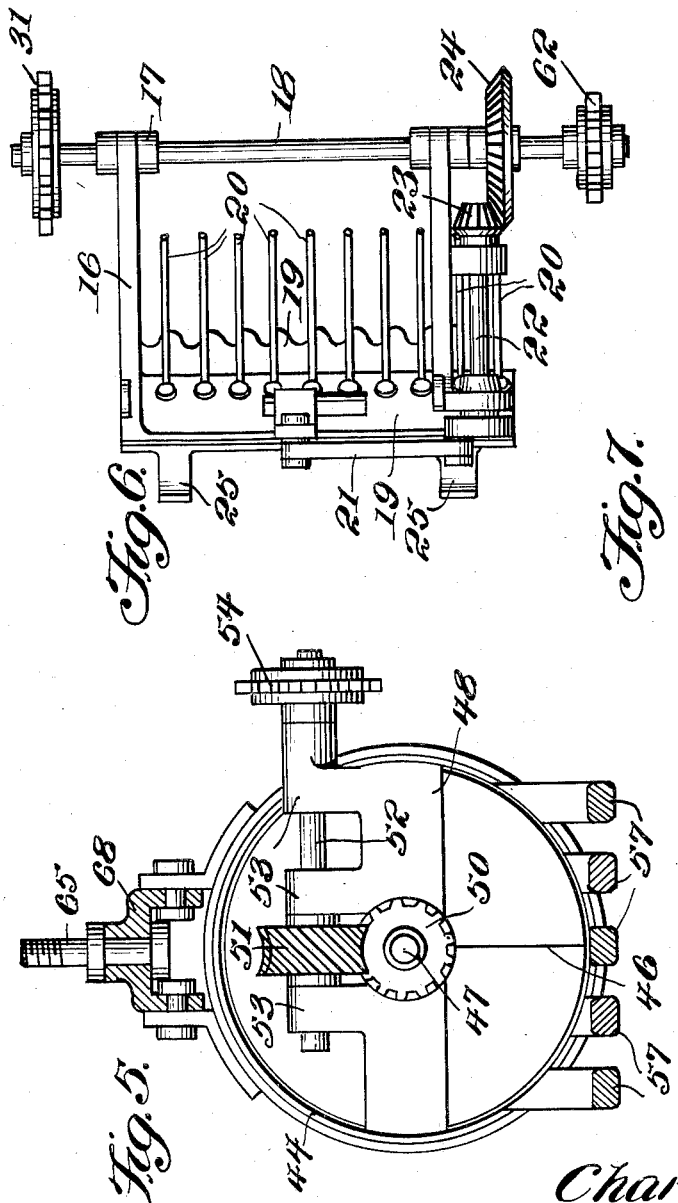
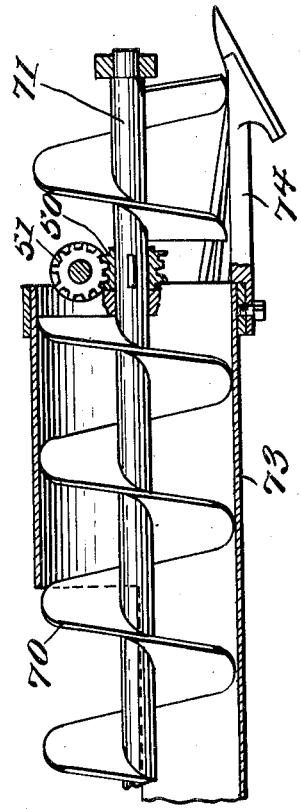
Charles P. Powers
INVENTOR
BY Victor J. Evans & Co.
ATTORNEY
WITNESS: J. T. L. Wright Patented Oct. 30, 1934

1,978,505

UNITED STATES PATENT OFFICE 1,978,505

HARVESTING MACHINE

Charles P. Powers, Oakland, Calif.

Application January 3, 1934, Serial No. 705,117

6 Claims. (Cl. 55—9)

The invention relates to a harvesting machine and more especially to a potato, beet or other vegetable harvester.

The primary object of the invention is the provision of a machine of this character, wherein potatoes, beets or other grown vegetables of a like character can be removed from the ground and delivered into a wagon or other conveyor and in the harvesting of beets the same can be topped and the tops delivered to one side of the machine during the operation thereof.

Another object of the invention is the provision of a machine of this character, wherein the digging, topping and delivering of the products can be carried forth economically and with dispatch, the machine in its entirety being of novel construction and the digging plows being susceptible of adjustment, as well as the gathering mechanism.

A further object of the invention is the provision of a machine of this character, wherein the working parts are assembled so as to render the machine compact and also for the automatic working thereof.

A still further object of the invention is the provision of a machine of this character which is comparatively simple in its construction, thoroughly reliable and efficient in its operation, susceptible of adjustment for the perfect working, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of a machine constructed in accordance with the invention and its frame being partly broken away for detail purposes.

Figure 2 is a top plan view.

Figure 3 is a fragmentary sectional view of a mounting of an adjusting screw or stem of the machine.

Figure 4 is a fragmentary sectional view showing the coupling of the adjusting screw or stem with one of the digging plows.

Figure 5 is a sectional view on the line 5—5 of Figure 1 looking in the direction of the arrows.

Figure 6 is a sectional view on the line 6—6 of Figure 1 looking in the direction of the arrows.

Figure 7 is a fragmentary vertical longitudinal sectional view through the elevator of the machine, showing a slight modification.

Similar reference characters indicate corresponding parts throughout the several views in the drawings.

Referring to the drawings in detail, the harvesting machine comprises a wheeled frame or chassis 10 having the slightly widened rear end portion 11, while at the front end of this frame or chassis is the draft hitch beam 12, the rear portion 11 being fitted with a journal 13 for traction wheels 14, these carrying peripheral calks 15 of any standard kind.

Arranged at the fore part of the frame or chassis 10 is topping mechanism, as for example, beets, which includes a substantially U-shaped hanger 16 swingingly connected at 17 with a driven shaft 18 suitably journaled upon the frame or chassis 10 to be disposed crosswise thereof. The hanger 16 carries a reciprocating knife bar 19 coacting with combing fingers 20, these being stationarily carried by the hanger 16. The bar 19 is reciprocated by a pitman 21 actuated from a shaft 22 having the pinion 23 meshing with the gear 24 upon the shaft 18 which is driven in a manner presently described. The hanger 16 is rearwardly inclined and its heel 25 contacts and slides upon the ground during the advancement of the machine. Acting upon the hanger 16 at each side thereof is a tensioning device 26 which urges the heel 25 of such hanger against the ground to sustain the cutting blade or knife 19 in a plane for the topping of beets, while the combing fingers 20 gather the beet tops for their discharge to one side of the machine.

Upon the fore part of the machine or chassis 10 is a stand 27 supporting a blower 28, this being of any approved type and fitted with a blast hose 29 which is arranged with relation to the topping mechanism so that the air delivered by the blower 28 will be active upon the severed tops of beets for the discharge of such tops to one side of the machine. The operating shaft 30 of the blower is driven from a sprocket gear and chain connection 31 with the shaft 18.

Located rearwardly of the topping mechanism at opposite sides of the frame or chassis 10 are digging plows 32, each having its beam 33 pivoted at 34 to the underside of the frame or chassis 10. Bridging the frame or chassis 10 above the beams 33 of the plows 32 is a mounting 35 having pivoted at 36 thereto vertically swinging brackets 37, each receiving an adjusting screw or stem 38 swiveled in a coupling 39 pivoted at 40 to its companion beam 33 of the plow 32. The screw or stem 38, at its upper end, is fitted with a hand wheel 41 provided with a hand knob or handle 42 for the convenient turning thereof. Thus it will be seen that each plow 32 can be regulated by adjustment thereof to vary the digging depth of the same for the digging of grown vegetables as may be planted in the ground.

Supported by the journal 13 are rocking mounts 43 for an elevator including a cylindrical body 44 cut away at 45 at its uppermost side for a distance of the length thereof and longitudinally disposed therein is a screw conveyor 46, its center axle 47 being journaled in the end castings 48 and 49, respectively, these being disposed transversely of the cylindrical body 44 at opposite open ends thereof at its transverse center. The axle 47 of the screw conveyor 46 carries a worm threaded pinion 50 meshing with a worm threaded gear 51 upon a shaft 52 supported in a bearing 53 made fast in the forward end portion of said cylindrical body 44. This shaft 52 carries a sprocket wheel 54 over which is trained an endless sprocket chain 55, the latter being trained over a sprocket wheel 56 upon the journal 13 so that motion will be transmitted from the traction wheels 14 to the conveyor 46 for the working thereof.

At the forward open end of the cylindrical body 44 constituting the elevator is a gatherer including the forwardly directed inclined gathering fingers or tines 57, each carrying a shoe 58 having the pointed toe 59 and these fingers 57 gather the dug up products, whence the same, by the conveyor 46, are lifted into the cylindrical body 44 which discharges the same from its upper open end into a wagon or other conveyor.

The journal 13 carries a sprocket wheel 60 over which is trained an endless sprocket chain 61, the same being also trained over a sprocket wheel 62 on the shaft 18 so that motion will be transmitted from the journal 13 to the said shaft 18 for the operation of the topping mechanism and the blower.

Upon the frame 10, at opposite sides thereof, are uprights 63 swingingly supporting a stem or screw bearing 64 in which is threaded the adjusting stem or screw 65 which, at its upper end, carries the hand wheel 66 provided with a hand knob or handle 67, while the lower end of this stem or screw 65, through the pivot coupling 68, is attached to the forward open end of the cylindrical body 44. By adjustment of the stem or screw 65 it will be apparent that the cylindrical body 44 can be varied as to its angular tilt for the control of the discharge or delivery of products therefrom into a wagon or other conveyor. It is, of course, understood that the wagon or other conveyor will trail the machine and is coupled therewith in any desirable manner.

Adjustably carried by the frame or chassis 10 is a sprocket chain tightener 69 acting with the chain 61.

The draft of the machine may be by the use of a tractor, draft animals or otherwise.

In Figure 7 of the drawings there is shown a slight modification of elevator, wherein the screw conveyor 70 has its front end 71 extended through the forward open end of the cylindrical body 73 for coextension with the gatherer 74 carried at this forward open end of said body 73.

In the operation of the machine the elevator is adjusted to the proper forward inclination or angle and when the machine is moved forwardly the topping mechanism in its operation will cut the tops of beets in advance of the digging of the same by the plows 32 and these tops will be blown to one side of the line of draft of the machine for discharge by the blower 48. The beets dug from the ground by the plows 32 will be collected by the gatherer through its fingers 57 and the screw conveyor 46 will lift the gathered products through the cylindrical body 44 constituting the elevator and the latter will discharge the products through the open end of the cylindrical body 44 into a wagon or other conveyor.

It should be apparent that the machine is adaptable for the digging of potatoes or other grown vegetables or products and is susceptible of adjustment for the proper working of such machine.

What is claimed is:

1. A machine of the character described comprising a wheeled frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, and means for operating the topping mechanism, blower and screw conveyor from the wheels of the frame.

2. A machine of the character described comprising a wheel frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, means for operating the topping mechanism, blower and screw conveyor from the wheels of the frame, and means for angularly adjusting the elevator cylinder.

3. A machine of the character described comprising a wheel frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, means for operating the topping mechanism, blower and screw conveyor from the wheels of the frame, means for angularly adjusting the elevator cylinder, and a gatherer at the forward end of the cylinder.

4. A machine of the character described comprising a wheel frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, means for operating the topping mechanism, blower and screw conveyor from the wheels of the frame, means for angularly adjusting the elevator cylinder, a gatherer at the forward end of the cylinder, and means for independently adjusting the digging means.

5. A machine of the character described comprising a wheel frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, means for operating the topping mechanism, blower and screw conveyor from the wheels of the frame, means for angularly adjusting the elevator cylinder, a gatherer at the forward end of the cylinder, means for independently adjusting the digging means, and means active upon the topping mechanism to urge the same in the direction of the ground.

6. A machine of the character described comprising a wheeled frame, beet topping mechanism arranged forwardly of the frame, a blower coacting with the beet topping mechanism, digging means mounted at opposite sides of the frame and independently adjustable, an elevator cylinder swingingly supported relative to the frame and having a screw conveyor, means for operating the topping mechanism, blower and screw conveyor from the wheels of the frame, means for angularly adjusting the elevator cylinder, a gatherer at the forward end of the cylinder, means for independently adjusting the digging means, means active upon the topping mechanism to urge the same in the direction of the ground, and a reciprocating cutter bar included in said topping mechanism.

CHARLES P. POWERS.